DIGITAL COORDINATE RESOLVER

Filed April 14, 1961

INVENTOR.
LEO ROSEN
BY Kenway, Jenney & Hildreth
ATTORNEYS

INVENTOR.
LEO ROSEN
BY Conway, Jenney & Hildreth
ATTORNEYS

INVENTOR.
LEO ROSEN
BY Kenway, Jenney & Hildreth
ATTORNEYS

United States Patent Office 3,184,847
Patented May 25, 1965

3,184,847

DIGITAL COORDINATE RESOLVER

Leo Rosen, Middletown, Conn., assignor to Anelex Corporation, Boston, Mass., a corporation of New Hampshire Filed Apr. 14, 1961, Ser. No. 103,161
2 Claims. (Cl. 33—1)

My invention relates to coordinate resolvers, and particularly to improved means for supplying digital position coordinates of a plotting or recording stylus to indicators, computers, recorders, and the like.

Where a plotting board or recorder is employed as an element of a controlled process or of an automatic system, the position of the plotting or recording stylus is most conveniently expressed in terms of its coordinates in a predetermined plane or frame of reference. Numerous systems have been proposed for generating analog position coordinates in response to the position of a stylus in a plotting area. However, it is frequently desirable to provide this information in digital form, either for visual interpretation or for application to data processing equipment such as computers and the like. Prior to my invention, so far as I am aware, there has been no satisfactory solution to this problem. Accordingly, it is the primary object of my invention to provide a rapid and accurate system for resolving the position of a moving stylus into digital coordinates.

Other objects and further advantages of my invention will become apparent to those skilled in the art as the description proceeds.

Briefly, in accordance with a preferred embodiment of my invention, the stylus of a plotting board is provided with a photocell disposed to be illuminated from two orthogonal directions. Two light sources are placed along orthogonal reference axes and rotated at a constant rate, 180° out of phase. Each light source is shielded on the side facing the plotting area, and is placed at the focal point of a parabolic mirror facing the plotting area, such that the rotating beam is reflected across the plotting area and scans the area in the direction of the reference axis associated with the light source during a half revolution. During the scanning cycle for each axis, a pulse source emits pulses at time intervals corresponding to equal distances of beam scan along the X or Y axis, as the case may be. These pulses are supplied to a counter until the scan passes the stylus photocell, when the supply is terminated. The accumulated pulse count, which is proportional to the orthogonal coordinate of the position of the stylus on the axis being scanned, is applied to a register, and at the end of the scanning cycle for that axis, the counter is reset.

The detailed construction and mode of operation of the digital coordinate resolver of my invention will best be understood by reference to the accompanying drawings, in conjunction with the following detailed description, of a preferred embodiment of my invention.

Figure 1:
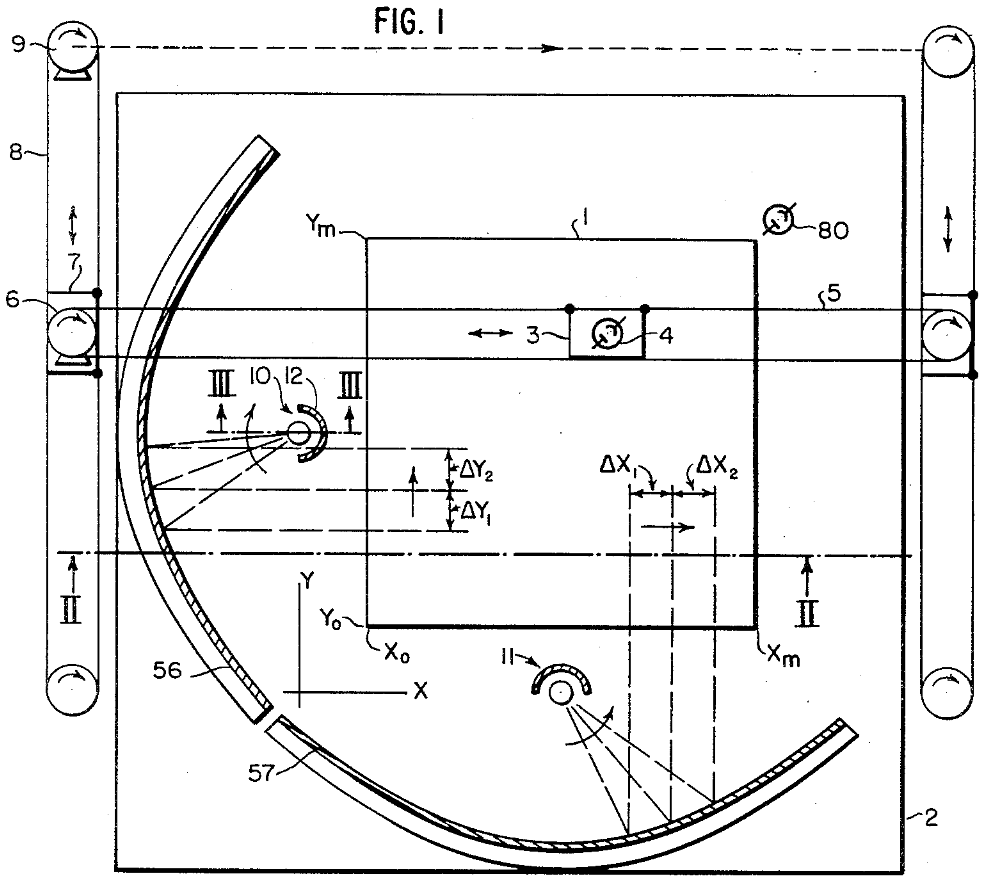
FIGURE 1 is a schematic plan view of a plotting board incorporating an embodiment of my invention.
Figure 2:
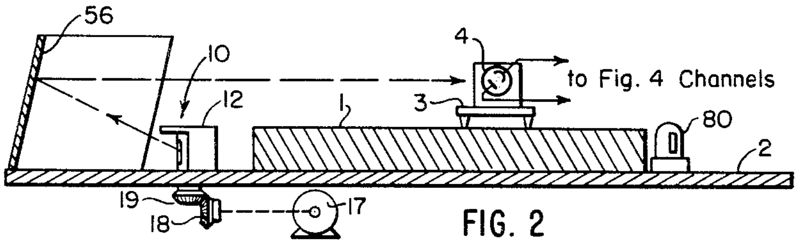
FIGURE 2 is an elevation of a portion of the plotting board of FIG. 1, partly in cross section, taken along lines II—II in FIG. 1.
Figure 3:
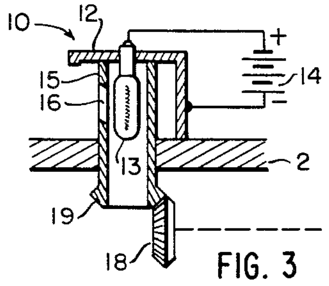
FIGURE 3 is a cross-sectional view of a portion of the plotting board of FIG. 1, taken along lines III—III in FIG. 1, and showing the details of a rotating light source.

Referring now to FIGURES 1, 2 and 3, I have shown a platform 1 defining a rectangular plotting area raised above and mounted on a base 2. A stylus 3 is disposed over the plotting area and arranged to be moved in a conventional manner in accordance with any desired function of a variable to be displayed; for example, a temperature as a function of a pressure, or the position of a moving body on the earth's surface. Since apparatus for manually or automatically moving a stylus on a plotting area in this manner is well known, and does not form a part of my present invention, it has not been shown in detail. However; it is convenient in the practice of my invention to employ means for moving the stylus which will move it from one position to the other without rotation. As exemplary of such apparatus, I have shown schematically a cable 5 attached to one side of the stylus 3 and reversibly actuated by a servomotor 6 attached to a guide 7. Guide 7 is in turn attached to a cable 8, which is arranged to be reversibly actuated by a second servomotor 9. Such an arrangement is sufficiently well known in the art that it will be understood from the drawing without further description.

Mounted on stylus 3, in any conventional manner, is a photocell 4 which is disposed to be illuminated either by a ray of light moving upwardly in the plane of the drawing, or by a ray of light moving from left to right in the plane of the drawing.

At the left side of the platform 1 is disposed a first rotating light source generally designated as 10, and on the right side of the platform 1 is mounted a light source generally designated as 11. As shown in FIGURES 1, 2 and 3, the light source 10 is provided with a shield 12 which prevents direct radiation toward platform 1. The side away from the platform is open, and as best shown in FIGS. 2 and 3, a lamp 13 is arranged to be energized by a suitable battery 14, and mounted in the shield 12. The lamp is surrounded by a rotatable sleeve 15 extending through the base 2 and provided with a hole or slit 16 which is arranged to permit a narrow beam of light to emerge in a direction determined by the angular orientation of the sleeve 15.

As shown in FIGS. 1 and 2, the optical center of the rotating source 10 is disposed at the focal point of a parabolic mirror 56, which is mounted on base 2 at a slight angle such that rays of light from the source 10 are reflected horizontally across the plotting area defined by platform 1. Since the mirror is parabolic, as sleeve 15 rotates, parallel rays are reflected across platform 1 which scan the platform in a direction normal to a reference axis X associated with the rotating source 10.

As shown in FIGS. 2 and 3, a motor 17 is arranged to drive sleeve 15 through suitable gears 18 and 19. Similar gears 20 and 21 (FIG. 4) are driven by the shaft of motor 17, in a conventional manner which is not shown in detail, such that the sleeve of the light source 11 corresponding to sleeve 15 of light source 10 is driven at the same speed as sleeve 15 and 180° out of phase. By this arrangement, the X-axis scan is accomplished during one-half of each revolution of the rotor shaft, and the Y-axis scan is accomplished during the other half of each revolution.

As indicated in FIG. 1, associated with the lower left hand corner of platform 1 are reference coordinates $X_0$ and $Y_0$ which mark the origin of the plotting coordinates. Associated with the lower right-hand corner of platform 1 is the coordinate $X_m$, which marks the excursion of the stylus in the X direction which is the maximum to be recorded, and associated with the upper left-hand corner of a platform 1 is a coordinate $Y_m$, which marks the excursion of the stylus in the Y direction which is the maximum to be recorded.

An auxiliary photocell 80 is mounted, as best shown in FIGURES 1 and 2, just beyond the corner of the raised platform 1 so that it will be illuminated on both the X and Y scans after the beam has passed the maximum position to be recorded. As shown in FIG. 2, the beam from the light sources may be wide enough vertically so that photocell 80 may be mounted below the surface of platform 1.

While I have shown the mirror and light sources disposed to resolve the position of the stylus into orthogonal coordinates, within the broader aspects of my invention they could also be arranged to provide information in non-orthogonal coordinates, as by displacing the axes of the mirrors, or by modifying the shape and orientation of the mirrors, if so desired.

Figure 4:
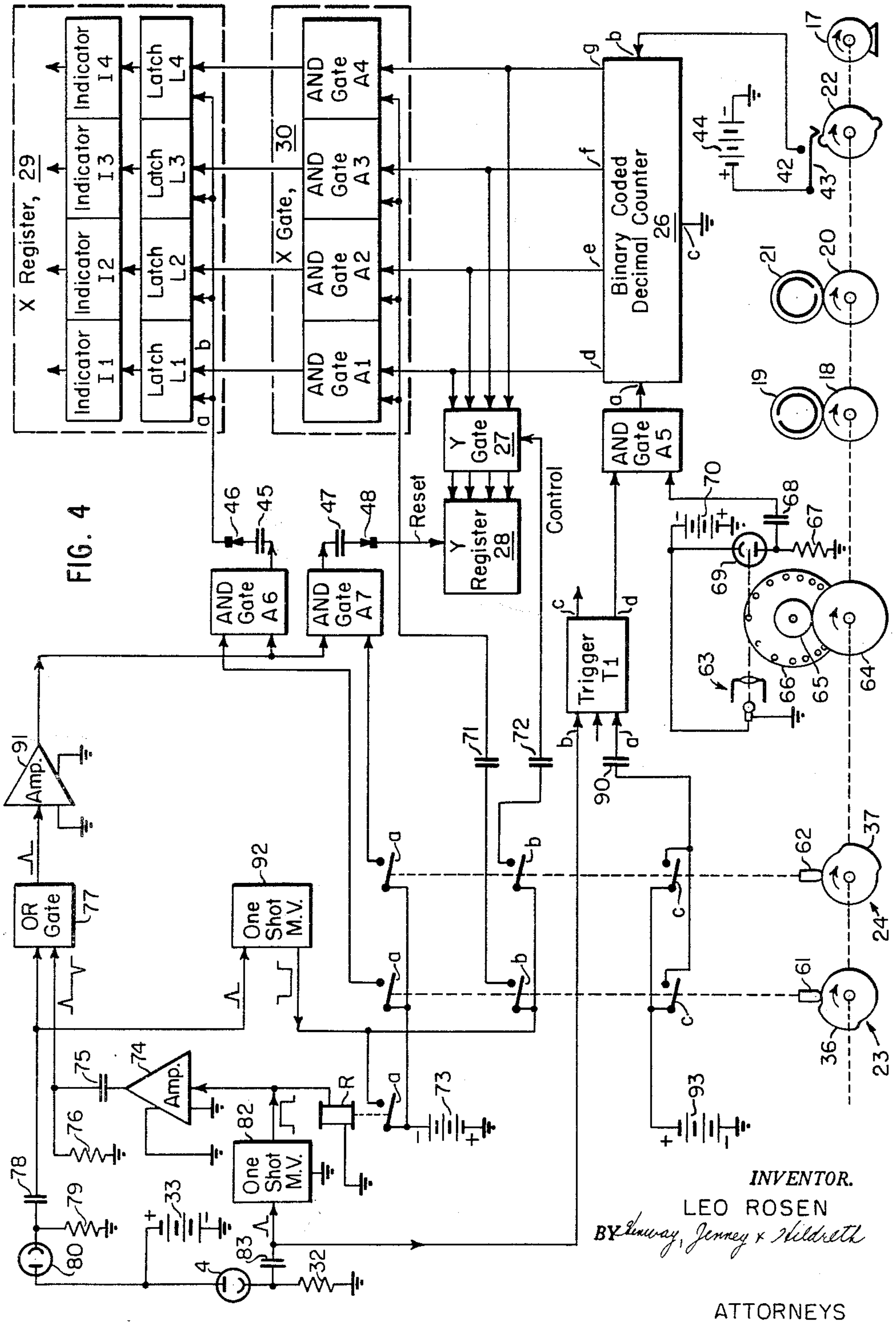
FIGURE 4 is a schematic wiring diagram of a control system forming a part of the plotting board of FIG. 1.

The circuit arrangement by which the coordinates of the stylus 3 of FIG. 1 may be registered is shown in FIG. 4. In FIG. 4, parts corresponding to those shown in FIG. 1 are given corresponding reference numerals.

Referring to FIG. 4, as schematically shown, in addition to drive gears 18 and 20 for light sources 10 and 11, motor 17 also drives a counter reset cam 22, an X-scan cam 23, a Y-scan cam 24, and a pulse generator drive gear 64. Additional apparatus required in this embodiment of my invention comprises a variable frequency pulse generator comprising an apertured disc 66 driven from gear 64 by a gear 65, a narrow light beam source 63, and a photocell 69; a pulse counter 26; a set of Y register gates 27; a Y register 28; a set of X-register gates 30; an X register 29; a relay R; and various trigger and gate circuits, all of which will be described in detail below.

The variable frequency pulse generator may be any suitable means for producing a series of pulses at a controllable rate, but as here shown comprises an optical shutter for supplying timed pulses of light from a narrow beam source 63 to a photocell 69. The shutter consists of a disc 66 provided with a plurality of holes spaced about its periphery, the spacing being such that when driven by the shaft of motor 17 through gears 64 and 65, pulses of light pass through the holes after equal increments of movement of the scanning beams along the axis being scanned. Referring to FIG. 1, this is necessary because increments such as $\Delta X_1$, $\Delta X_2$ on the X axis, and $\Delta Y_1$, $\Delta Y_2$, on the Y axis, are not equal for equal angles of rotation of the light sources. Gears 64 and 65 are preferably so proportioned that the disc 66 makes one revolution for each one-half revolution of the shaft of motor 17, so that the entire periphery of the disc can be used for each axis, thus permitting a more accurate measurement with a disc of given size. The symmetry of the optical systems for the two axes of scanning makes this arrangement possible.

Beam source 63 and photocell 69 may be energized from a suitable source of energy, such as the battery 70 shown. The circuit for photocell 69 extends from ground at the positive terminal of battery 70, through the battery, and from the negative terminal of the battery through the photocell and through a resistor 67 to ground. A capacitor 68 connected to the junction of photocell 69 and resistor 67 is provided to apply a negative-going pulse to one input terminal of AND gate A5 for each pulse of light transmitted to photocell 69.

Counter 26 may be of any suitable conventional construction, but as here shown comprises a binary-coded decimal counter, of any desired number of decades, which may be of the type shown in detail in Fig. 15.56 on page 56, section 15, of the Handbook of Semiconductor Electronics, first edition, edited by Lloyd P. Hunter, and published in 1956 by the McGraw-Hill Book Co., Inc. In FIG. 4 input terminal *a* corresponds to the input terminal of Fig. 15.56 of the Handbook, and reset terminal *b* corresponds to the reset line in Fig. 15.56. The unit is returned to ground at terminal *c*. Output terminals *d*, *e*, *f* and *g* in FIG. 4 correspond to the left-hand output terminals of triggers T1, T2, T4 and T8 in Fig. 15.56. The triggers may be of the type shown on the preceding page of the Handbook, in Fig. 15.54. The operation of this circuit is such that the output terminals of the counter are at ground, or a negative potential, in a code sequence determined by the number of positive pulses applied to input terminal *a*. At the tenth count, the counter will reset to the zero state, and it may be reset to zero at any time by the application of a positive pulse to reset terminal *b*. The states of the output terminals at each count are shown in the table on page 15–56 of the Handbook; as there shown, a 1 in the output code is represented by a negative voltage at the corresponding output terminal. As noted above, more than one decade can obviously be employed, though only one has been shown for simplicity. For example, three decades would permit the position of the stylus along an axis to be specified to one one-thousandth of the length of the plotting area.

Trigger circuit T1 may be of the type shown in Fig. 15.54 on page 15–55 of the above cited Handbook, and is here shown in the diagrammatic form also shown in the Handbook. This circuit is used in the system of FIG. 4 as a bistable unit controlled by positive pulses applied to its outer input terminals *a* and *b*. A positive pulse applied to input terminal *a* will set the unit to a state in which its output terminal *c* is at ground potential and its output terminal *d* is at a negative potential, and a positive pulse applied to input terminal *b* will reset the unit to a state in which its output terminal *c* is negative and output terminal *d* is grounded. When photocell 4 is illuminated, a reset pulse is applied to input terminal *b* of trigger T1 through capacitor 83. At the start of the X scan, terminal *a* of trigger T1 is energized with a set pulse supplied from the positive terminal of battery 93 over a contact *c* closed by cam follower 61. At the start of the Y scan, a similar circuit is established over a contact *c* closed by cam follower 62.

AND gates A1, A2, A3, A4, A5, A6 and A7, and the corresponding gates in Y Gate 27, may be of the type shown in Figure 209B on page 215 of TM 11–690, Basic Theory and Application of Transistors, published by Headquarters, Department of the Army, March, 1959, modified by the use of n-p-n transistors rather than p-n-p, with suitable bias reversals, to produce a positive output voltage in response to two negative input pulses.

OR gate 77 may be of the type shown in Figure 206A on page 211 of TM 11–690, cited above, which produces a positive-going output pulse in response to a positive pulse applied to either input terminal.

Latch circuits L1, L2, L3 and L4, and the corresponding latch circuits in Y register 28, may be of the type shown in Fig. 15.52 on page 15–52 of the above cited Handbook of Semiconductor Electronics. As there shown, two transistors are employed, and a positive pulse applied to input terminal 2, corresponding to input terminal *a* of latch L1 in FIG. 4 and corresponding terminals of units L2, L3 and L4, will cause both transistors to conduct, whereas a positive pulse applied to input terminal 1, corresponding to terminal *b* of latch L1 and corresponding terminals of the other units, will cause both transistors to cut off. Thus, an output terminal connected to the collector of the n-p-n, or upper transistor in Fig. 15.52 of the Handbook, corresponding to the output terminal of latch L1, will be at ground potential following a positive input to terminal 2, and at a positive voltage following a positive input to terminal 1, which conditions will be maintained until a positive pulse is applied to the other input terminal.

Indicators I1, I2, I3 and I4, and the corresponding indicators in Y register 28, can be of the type shown in Fig. 15.53 on page 15–53 of the above cited Handbook of Semiconductor Electronics. As there shown, an applied positive input pulse will cause one or more neon indicator lamps to conduct. The output terminal shown on the various indicators corresponds to the output terminal in Fig. 15.53 of the Handbook, and can be used to supply other information processing apparatus such as a computer or the like. Of course, various other indicators or other utilization devices could be employed to register the digital coordinates; for example, an electric lamp of suitable voltage and current ratings could be connected directly to the output of each of the latch circuits.

As shown in FIG. 4, photocell 4 is connected, by connections made to the stylus mounting in any conventional manner, not shown, in a circuit which extends from ground to the negative terminal of a suitable battery 33, and from the positive terminal of battery 33 to the anode of photocell 4. The cathode of photocell 4 is connected to ground through a suitable resistor 32. Thus, when illuminated, a positive voltage will appear at the cathode of photocell 4. The cathode of photocell 4 is connected through a coupling capacitor 83 to the input terminal of a conventional one shot multivibrator 82, which functions in a conventional manner to produce an elongated pulse output in response to an applied pulse. The output of capacitor 83 is also connected to input terminal *b* of trigger T1.

Relay R has one terminal of its winding connected to the output of one shot multivibrator 82, and the other terminal grounded as shown. It is provided with a single front contact *a*, which is closed a short time after the winding is energized, due to inherent inductive and mechanical delay, to supply a positive pulse from a battery 73 to circuits, to be described, for controlling the transfer of information from counter 26 to X gate 30 or Y gate 27.

The sequence of operation of the system of FIG. 4 is controlled by photocell 4 in conjunction with a series of cams driven by the shaft of constant speed motor 17. As described above, gears 18 and 20 of the shaft drive gears 19 and 21 of the rotating light sources 10 and 11 in FIG. 1 in such a way that the rotating beams of light are 180° out of phase. During the 180° of rotation of source 10 in which the X axis is scanned, two events must be marked. These are the moment when the scan reaches $X_0$, and the moment when the scan reaches the photocell 4. The first event is signaled by a projection 36 on cam 23. When projection 36 reaches a predetermined point coinciding with start of the scan at $X_0$, a cam follower 61 is actuated to close associated contacts *a*, *b* and *c* which remain closed until the scan reaches the point just beyond the $X_m$ at which photocell 80 is energized. A similar projection 37 on cam 24 actuates a cam follower 62 to close its associated contacts *a*, *b* and *c* between $Y_0$ and the time during the Y scan just beyond $Y_m$, at which photocell 80 is illuminated.

At the end of each scanning cycle for each axis, it is desirable to rest counter 26 to zero so that it will be ready for the next scan. This function is accomplished by a counter reset cam 22 having two projections 180° apart to close a pair of contacts 42 and 43 at the end of each half revolution. With contacts 42 and 43 closed, a pulse of positive voltage from battery 44 is applied to reset terminal *b* of counter 26.

At the point at which the light beam reaches the photocell 4 during each scan, it is desired to reset the corresponding register and then to apply to it the new coordinate data, which may or may not be changed from the previous value. This operation is carried out by a group of circuits which will next be described.

Latch circuits L1, L2, L3 and L4, described above, have their output terminals connected to the input terminals on indicators I1, I2, I3 and I4 in register 29. A similar structure is provided in Y register 28. In a manner described above, each latch circuit such as L1 will provide a positive voltage at its output terminal which will actuate the corresponding indicator such as I1 when a positive pulse is applied to its input terminal *b*. When a positive pulse is applied to input terminal *a* of a latch circuit, the output terminal is reset to ground potential.

The reset terminals of the latch circuits L1–L4, exemplified by terminal *a* of the latch circuit L1, are connected to the output terminal of AND gate A6 through at coupling capacitor 45 and a diode 46. The output terminal of AND gate A7 is similarly connected to Y register 28 through a capacitor 47 and a diode 48.

One input terminal of each of AND gates A6 and A7 is connected to the output of OR gate 77 through a suitable inverting amplifier 91. As will appear, OR gate 77 will emit a positive pulse when either photocell 4 or photocell 80 is illuminated, causing amplifier 91 to apply a negative pulse to AND gates A6 and A7. The other input terminals of AND gates A6 and A7 are energized during the X scan and the Y scan, respectively. AND gate A6 has its upper input terminal energized during the X scan by a circuit extending from the negative terminal of battery 73 over contact *a* of cam follower 61. AND gate A7 has its lower input terminal energized during the Y scan by a circuit extending from the negative terminal of battery 73 over contact *a* of cam follower 62. Thus, AND gate A6 is actuated to apply a reset pulse to the input terminals of the latch circuits in X register 29, during the X scan, when OR gate 77 emits a pulse. Similarly, AND gate A7 is actuated to apply a reset pulse to the input terminals of the latch circuits in Y register 28, during the Y scan, when OR gate 77 emits a pulse.

As described above, a positive pulse applied to either input terminal of OR gate 77 will cause a positive pulse to appear at the output terminal. The upper input terminal is arranged to be energized when photocell 80 is illuminated. For this purpose, photocell 80 is connected in a circuit extending from ground through battery 33 from the negative terminal to the positive terminal, thence through photocell 80 from the anode to the cathode, and thence through a resistor 79 to ground. The junction of resistor 79 and the cathode of photocell 80 is coupled to the upper input terminal of OR gate 77 through a suitable capacitor 78. Thus, a positive pulse is applied to the upper input terminal of OR gate 77 when photocell 80 is illuminated. Illumination of photocell 80 also applies a pulse to a one shot multivibrator 92, which may be of conventional design, and which incorporates a stage of invertion to produce an elongated negative pulse.

A circuit for energizing the lower input terminal of OR gate 77 extends from the output terminal of one shot multivibrator 82, through a suitable non-inverting amplifier 74, and through a suitable differentiating network, here shown as a series capacitor 75 and a shunt resistor 76, to the lower input terminal of the OR gate. As shown schematically in the drawing, the differentiating network forms a positive pulse at the leading edge of the square wave output from the multivibrator, thus actuating OR gate 77 at substantially the time that photocell 4 is illuminated. A negative pulse is also formed, at the trailing edge of the multivibrator output pulse, but this pulse does not affect the OR gate.

The transfer of information from counter 26 to X gate 30 and Y gate 27 is controlled by a pair of circuits that enable the AND gates in the appropriate gate at the proper time during the scan of each axis. Thus, the left-hand input terminals of AND gates A1, A2, A3 and A4 in X gate 30 are energized with a negative pulse supplied through a suitable coupling capacitor 71 by a circuit extending from the negative terminal of battery 73 over front contact *a* of relay R, closed shortly after photocell 4 is illuminated, and contact *b* of cam follower 61, closed during the X scan. A similar circuit for Y gate 27 extends from the negative terminal of battery 73 over front contact *a* of relay R and contact *b* of cam follower 62, through a coupling capacitor 72 to Y gate 27. As shown, parallel enabling circuits for X gate 30 and Y gate 27 extend from the output of multivibrator 92 over contacts *b* of cam followers 61 and 62 and capacitors 71 and 72, respectively, to the associated gates. These circuits are energized when photocell 80 is illuminated, for purposes to be described below .

The right hand terminals of latch circuits L1 through L4 are connected to the AND gates A1 through A4, respectively, which collectively comprise X gate 30. These AND gates have one input terminal connected to the enabling circuits just described. As previously described, front contact *a* of relay R is closed a short time after AND gate A6 is actuated because of the delay imposed by relay R. During the X scan, a positive pulse will be applied to the AND gates comprising gate 30, and during the Y scan a positive pulse will be applied to gate 27. Confining attention to the X scan for the moment, output terminals *d, e, f* and *g* of counter 26 are connected to the other input terminals of AND gates A1 through A4, respectively, and if a negative voltage indicating a 1 appears at a given terminal at the same time that the positive pulse from the enabling circuit over front contact *a* of relay R and contact *b* of cam follower 61 is applied to the other input terminal, the associated AND gate will supply a pulse to its associated latch to actuate the associated indicator, which has just previously been restored to zero indication by the action of AND gate A6, as described above. Thus, the indications of the register are only momentarily interrupted when they are reset at the end of each scan. Corresponding operation of the Y register is provided by the parallel connections from the output terminals of counter 26, as shown.

At the start of each scan, and considering first the X scan which is started at $X_0$ by projection 36 on cam 23 actuating cam follower 61 to close its contacts *a, b* and *c*, a positive pulse from battery 93 is applied to input terminal *a* of trigger T1 over contact *c* of cam follower 61 and through capacitor 90. Trigger T1 is then set to the state described above, in which its output terminal *d* is at a negative potential. In this state of trigger T1, a negative voltage is applied to one input terminal of AND gate A5. The output pulses from photocell 69 which are applied to the other terminal of AND gate A5 then cause a series of positive pulses to be applied to the input terminal *a* of counter 26. This action will be continued until photocell 4 is illuminated, causing a positive pulse to be applied to input terminal *b* of trigger T1. In response to this pulse, trigger T1 will change state such that its output terminal *d* is returned to ground, and AND gate A5 is cut off to stop the flow of pulses to counter 26. The state of the counter is then read into the X register in the manner described above. At the end of the X scan, cam 22 will close contacts 42 and 43 and reset the counter as previously described.

Figure 5:
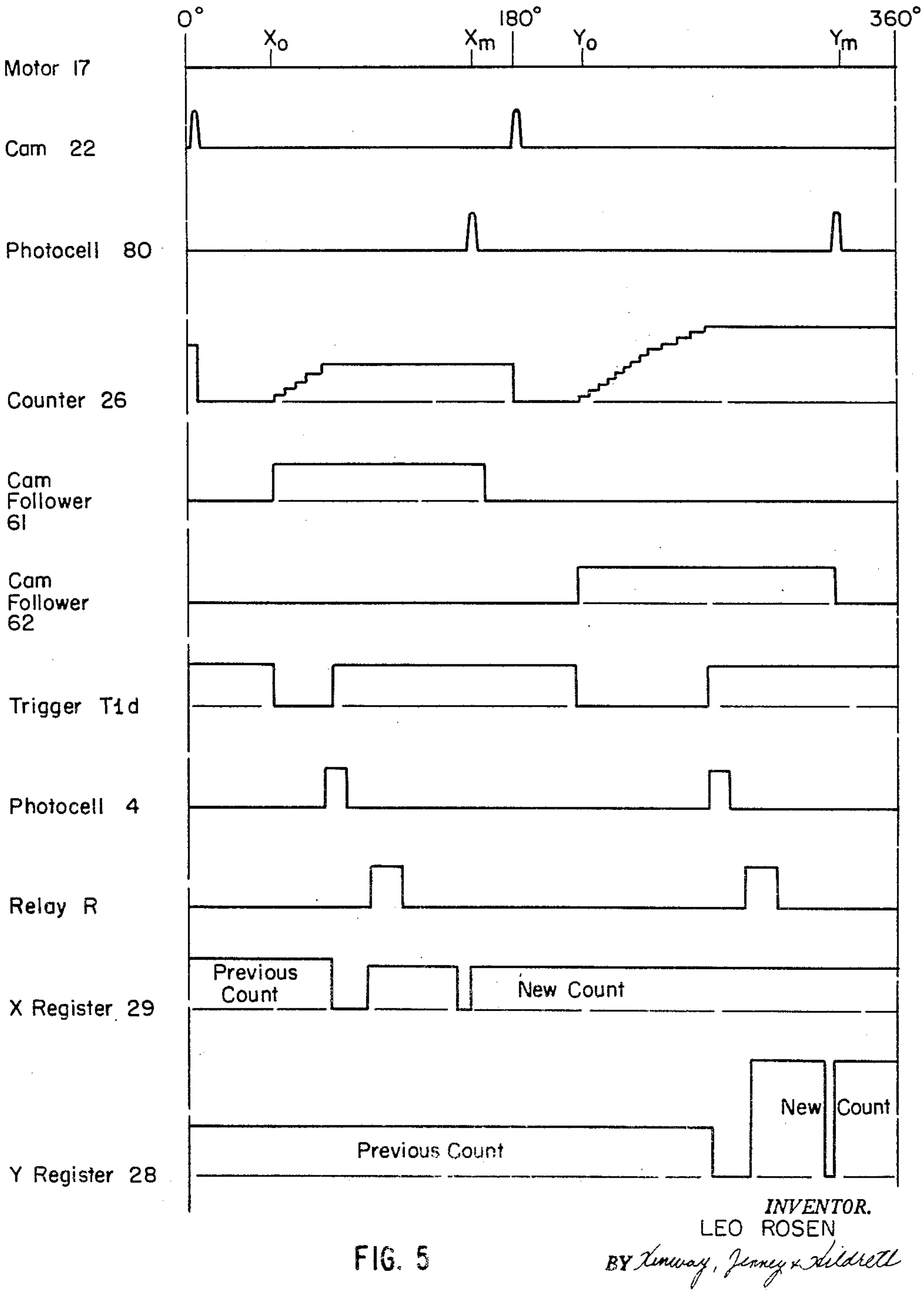
FIGURE 5 is a timing chart showing the sequence of operation of the system shown in FIGURE 4.

The operation of the disclosed embodiment of my invention will best be understood in connection with FIG. 5, showing the sequence of operation of the various elements of the system of FIGS. 1 through 4. As shown, the basic timing element of the system is the motor 17, periodically rotating from a reference position through 360°.

During the first 180° of rotation, the first operation is to reset the counter, which is done by a pulse generated by the action of cam 22. This pulse is supplied to reset terminal *b* of counter 26, causing the counter indication to drop from its previous value to zero, as indicated schematically in FIGURE 5.

At the position corresponding to $X_0$, projection 36 on cam 23 in FIG. 4 engages cam follower 61 to close its associated contact *c* and cause a pulse to be applied to input terminal *a* of trigger T1. As shown in FIG. 5, trigger T1 responds by changing state such that its output terminal *d* goes from ground to a negative potential.

Application of a negative voltage from terminal *d* of trigger T1 to one of the input terminals of AND gate A5 permits positive pulses to be produced at the output terminal of gate A5, one for each pulse supplied from photocell 69. The resulting pulses are counted by counter 26, as indicated by the stepwise increase in FIG. 5. Of course, the actual state change represented by the steps on FIG. 5 is a cyclic change in the permutation of ground or negative potentials appearing on the output terminals of counter 26.

At some point in the X scan, photocell 4 is illuminated and produces a positive pulse. This pulse is applied simultaneously to one shot multivibrator 82 and trigger T1. As previously described, trigger T1 changes state to return its output terminal *d* to ground, causing AND gate A5 to cut off, and thus cutting off the supply of pulses to counter 26 as schematically indicated in FIG. 5.

Multivibrator 82 produces an elongated pulse, which is applied to amplifier 74. The output of amplifier 74 is applied to the differentiating network comprising capacitor 75 and resistor 76, causing a positive pulse to appear in response to the leading edge of the elongated pulse, and a negative pulse to appear in response to the trailing edge, across resistor 76. The positive pulse actuates OR gate 77, which supplies a positive pulse that is inverted in amplifier 91 and applied to AND gates A6 and A7. At this time, as indicated in FIG. 5, cam follower 61 is in position to close its contact *a*, whereas contact *a* of cam follower 62 is open. Thus, only AND gate A6 emits a pulse. This pulse is applied through capacitor 45 and diode 46 to reset latch circuits L1–L4, causing indicators I1–I4 of the X register 29 to reset temporarily to zero, as shown in FIG. 5. It should be noted that the negative pulse applied to OR gate 77 to the trailing edge of the pulse from multivibrator 82 has no effect on the OR gate.

The elongated pulse output of multivibrator 82 also causes relay R to pick up, after a slight delay, as shown in FIG. 5, and to supply a positive pulse over its front contact *a*. This pulse is applied over contact *b* of cam follower 61 and through capacitor 71 to enable AND gates A1–A4 in X gate 30. This action causes the X gate to transmit the information on the output terminals of counter 26 to X register 29, resetting the latches L1–L4 where a 1 is transmitted, and leaving them unaffected where a 0 is transmitted, thus causing the indicators to set to the state corresponding to the counter indication. The X register now contains the X coordinate of the stylus as determined by the latest scan.

If the stylus is within the area to be recorded, photocell 80 will be illuminated as the scan passes $X_m$, after the above-described operation has taken place. The photocell will conduct, causing a positive pulse to be applied to OR gate 77 and to one shot multivibrator 92. In response to this pulse, OR gate 77 will actuate AND gate A6 to reset X register 29. At the same time, the elongated and inverted pulse from multivibrator 92 will be applied over contact *b* of cam follower 61 to open X gate 30, causing the X register to reset to the count accumulated in counter 26. The pulse from multivibrator 92 is sufficiently prolonged to ensure a positive reset. As indicated in FIG. 5, the result of this operation is a momentary interruption in the indication, which immediately returns to the proper value.

Should the stylus have moved beyond the recording area, photocell 80 will be illuminated before photocell 4. In this case, the counter will continue to count, and when the above described resetting action takes place, an indication greater than $X_m$ will be applied to the X register 29, which can be utilized as a fault or alarm signal. When photocell 4 is finally illuminated, the count will be terminated as before.

When the shaft of motor 17 reaches the 180° position, cam 22 produces a second counter reset pulse, and counter 26 is reset to zero as previously described. The same sequence of events just described for the X scan next occurs during the Y scan, except that the contacts operated by cam follower 61 will be open and the contacts operated by cam follower 62 will be closed, as indicated in FIG. 5, so that the Y gate 27 and Y register 28 are actuated, rather than the corresponding X-axis components.

While I have described only one embodiment of my invention in detail, many changes and variations will be apparent to those skilled in the art upon reading my description, and these can obviously be made without departing from the scope of my invention.

Having thus described my invention, what I claim is:

1. Apparatus for converting the position of a stylus movable on a plotting area into digital position coordinates on orthogonal reference axes, comprising, in combination, first and second parabolic mirrors disposed facing the plotting area to reflect light from their foci thereacross in orthogonal directions parallel to said axes, a rotatable light beam source disposed at the focal point of each mirror, means for shielding said sources from direct radiation over said plotting area, means for rotating said sources at a constant rate 180° out of phase, a pulse counter, means controlled by said rotating means for supplying pulses to said counter when said rotating means reaches a reference position during each half revolution of the light sources, a photocell mounted on the stylus and positioned to be illuminated by reflected light from either source, means controlled by said photocell when illuminated, for terminating the supply of pulses to said counter, means controlled by said photocell when illuminated for registering the state of said counter, and means controlled by said rotating means at the end of each half revolution of said sources for resetting said counter to a reference state.

2. Apparatus of the class described, comprising, in combination, a photocell movable in a reference direction between two spaced extremes, a parabolic mirror mounted to direct beams of light from its focal point along parallel lines normal to said direction in a region including said extremes, a rotatable light beam source located essentially at the focal point of said mirror, means for shielding said beam from direct radiation toward said photocell, means for rotating said light source at a constant rate, a pulse counter, a source of pulses, means actuated in the part of each revolution of said light beam at which the beam intersects one of said extremes for connecting said pulse source to said counter, and means controlled by said photocell when illuminated for interrupting the supply of pulses to said counter.

References Cited by the Examiner

UNITED STATES PATENTS

| | | | |
|---|---|---|---|
| 2,113,899 | 4/38 | Oram | 250—220 X |
| 2,625,301 | 1/53 | Saxe | 250—203 X |
| 2,934,825 | 5/60 | Braybrook | 33—1 |

OTHER REFERENCES

Pages 141–143, November 1, 1957, Electronics (Eng. ed.).

ISAAC LISANN, *Primary Examiner.*

LEONARD FORMAN, *Examiner.*

UNITED STATES PATENT OFFICE
CERTIFICATE OF CORRECTION

Patent No. 3,184,847 May 25, 1965

Leo Rosen

It is hereby certified that error appears in the above numbered patent requiring correction and that the said Letters Patent should read as corrected below.

Column 5, line 47, strike out "the", second occurrence; line 54, for "rest" read -- reset --; column 6, line 6, for "at" read -- a --; line 45, for "invertion" read -- inversion --.

Signed and sealed this 28th day of September 1965.

(SEAL)
Attest:

ERNEST W. SWIDER
Attesting Officer

EDWARD J. BRENNER
Commissioner of Patents